United States Patent
Hardage

(10) Patent No.: US 9,058,179 B2
(45) Date of Patent: Jun. 16, 2015

(54) RETIREMENT SERIALISATION OF STATUS REGISTER ACCESS OPERATIONS

(75) Inventor: James Nolan Hardage, Austin, TX (US)

(73) Assignee: ARM Limited, Cambridge (GB)

( * ) Notice: Subject to any disclaimer, the term of this patent is extended or adjusted under 35 U.S.C. 154(b) by 1090 days.

(21) Appl. No.: 12/926,374

(22) Filed: Nov. 12, 2010

(65) Prior Publication Data

US 2012/0124340 A1    May 17, 2012

(51) Int. Cl.
- *G06F 15/00* (2006.01)
- *G06F 9/30* (2006.01)
- *G06F 9/40* (2006.01)
- *G06F 9/38* (2006.01)

(52) U.S. Cl.
CPC ............ *G06F 9/3836* (2013.01); *G06F 9/3857* (2013.01); *G06F 9/30101* (2013.01); *G06F 9/3834* (2013.01)

(58) Field of Classification Search
None
See application file for complete search history.

(56) References Cited

U.S. PATENT DOCUMENTS

| 5,434,995 | A | * | 7/1995 | Oberlin et al. | 713/375 |
| 6,115,811 | A | * | 9/2000 | Steele, Jr. | 712/244 |
| 6,295,601 | B1 | * | 9/2001 | Steele, Jr. | 712/244 |
| 2006/0117316 | A1 | * | 6/2006 | Cismas et al. | 718/103 |
| 2008/0282067 | A1 | * | 11/2008 | Ozer et al. | 712/214 |
| 2010/0333098 | A1 | * | 12/2010 | Jordan et al. | 718/103 |

* cited by examiner

*Primary Examiner* — George Giroux
(74) *Attorney, Agent, or Firm* — Nixon & Vanderhye P.C.

(57) ABSTRACT

A processor 2 for performing out-of-order execution of a stream of program instructions includes a special register access pipeline for performing status access instructions accessing a status register 20. In order to serialise these status access instructions relative to other instructions within the system access timing control circuitry 32 permits dispatch of other instructions to proceed but controls the commit queue and the result queue such that no program instructions in program order succeeding the status access instruction are permitted to complete until after a trigger state has been detected in which all program instructions preceding in program order the status access instruction have been performed and made any updates to the architectural state. This is followed by the performance of the status access instruction itself.

18 Claims, 3 Drawing Sheets

RETIREMENT SERIALISATION OF STATUS REGISTER ACCESS OPERATIONS

BACKGROUND OF THE INVENTION

1. Field of the Invention

This invention relates to the field of data processing systems. More particularly, this invention relates to the serialisation of status register access operations within a data processing system.

2. Description of the Prior Art

It is known to provide data processing systems with status registers storing various architectural and/or micro-architectural variables. An example of such registers include the current program status register (CPSR), coprocessor system configuration registers and the like used within the processors designed by ARM Limited of Cambridge, England. When it is desired to perform an access to such status registers (either a read access or a write access), then the programmer will assume that the effect of all instructions preceding the status register access instruction within the program order will have had their effect upon the status register being accessed such that the access will not produce an incorrect result, e.g. returning a read result which is not up-to-date or performing a write to the status register out of program order. These problems are compounded within processors which execute instructions in parallel and/or execute instructions out-of-order.

One known way of addressing the problem of serialisation of status register access operations is to identify such status register access instructions before they are dispatched (i.e. sent to an associated processing pipeline for further queuing and/or execution) and then halting dispatch of further instructions such that the processing pipelines will drain and all instructions preceding the status register access instruction within the program order will complete before the status register access instruction is released for execution. While this approach can ensure proper serialisation, it suffers from the disadvantage that halting dispatch while the processing pipelines drain adversely effects instruction processing throughput.

SUMMARY OF THE INVENTION

Viewed from one aspect the present invention provides an apparatus for executing a stream of program instructions, said apparatus comprising:

plurality of processing pipelines including a special register pipeline configured to respond to a status access instruction to perform a status register access operation to a status register configured to store at least one state variable;

dispatch queue circuitry configured to store a dispatch queue of undispatched program instructions awaiting dispatch to one of said plurality of pipelines;

commit queue circuitry configured to store a commit queue of uncommitted program instructions awaiting a determination to be permitted to complete processing;

result queue circuitry configured to store a result queue of unretired program instructions yet to update architectural state variables; and access timing control circuitry coupled to said special purpose pipeline, said commit queue circuitry and said result queue circuitry, said access timing control circuitry being configured such that, when said status access instruction is issued to said special register pipeline and while program instructions continue to be dispatched from said dispatch queue, said access timing control circuitry:

(i) controls said commit queue circuitry such that no program instruction succeeding in program order said status access instruction within said stream of program instructions is permitted to complete processing;

(ii) detects from said result queue circuitry a trigger state when all program instruction preceding in program order said status access instruction within said stream of program instructions have performed any updates to architectural state variables of said apparatus; and (iii) upon detection of said trigger state, triggers said special register pipeline to perform said status register access operation.

The present technique recognises that serialisation of the status register access instructions can be achieved with less impact upon the system performance by dispatching such instructions to a special register access pipeline and then controlling how other instructions in the system are committed and retired in order to ensure that serialisation is achieved. More particularly, when a status access instruction is dispatched to the special register pipeline, access timing control circuitry serves to control the commit queue circuitry for other instructions within the system such that no program instructions succeeding in program order relative to the status access instruction is permitted to complete processing. Furthermore, the access timing control circuitry detects from the result queue circuitry a trigger state when all instructions preceding in program order the status access instruction have performed their updates to the architectural state variables of the apparatus. This trigger state corresponds to the time at which serialisation has been achieved and the status access instruction can be performed by the special register pipeline. Throughout these processes the dispatch queue is permitted to continue to dispatch instructions to the plurality of processing pipelines even though these instructions will not be permitted to complete ahead of the status access instruction.

Once the special register pipeline has performed the status register access instruction, then the access timing control circuitry can lift the block on completion of succeeding program instructions enforced via the commit queue circuitry.

It will be appreciated that the status register could have a variety of different forms. In one example embodiment the status register is a program status register storing a program status value set by execution of program instructions preceding the status access instruction.

A convenient way of managing the commit queue and the result queue is to utilise a commit pointer value derived from a commit pointer register and/or a retirement pointer derived from a retirement pointer register.

In some embodiments a status access instruction may be marked with a marker flag within the commit queue and the access timing control circuitry configured such that it detects when the commit pointer indicates the entry including the marker flag to determine that there are no uncommitted program instructions preceding the program order for the status access instruction and then to stall the commit queue.

In an analogous manner the access timing control circuitry may detect when a retirement pointer matches the commit pointer as indicating the trigger state discussed above.

The special register pipeline may have an associated special register issue queue with each entry including an issue policy field for storing a value controlling the issue policy to be used for the instruction represented by the data stored within that entry. This permits different issue policies for the special register pipeline to be set on an instruction-by-instruction basis in order to cope with the different requirements of different instructions.

Examples of the issue policies which may be used include an early policy to whereby a program instruction issues when all source operands for the program instruction are valid, a committed policy whereby a program instruction issues when the program instruction is committed for completion and all source operands for the program instruction are valid, and an oldest unretired policy whereby a program instruction issues when all program instructions preceding in program order the program instructions concerned have performed any updates to architectural state variables, the program instruction is committed for completion and all source operands for the program instruction are valid.

It will be appreciated that the access timing control circuitry performs a variety of different roles within the system. In particular, the access timing control circuitry is responsible for controlling the operation of different parts of the overall system and detecting parameters/states associated with these different parts. Accordingly, whilst it is possible that the access timing control circuitry may be formed in one block, it is more convenient in some embodiments that the access timing control circuitry is distributed at a plurality of locations within the system.

Viewed from another aspect the present invention provides an apparatus for executing a stream of program instructions, said apparatus comprising:

plurality of processing pipelines means for performing processing operations, said plurality of processing pipeline means including a special register pipeline means for performing a status register access operation to a status register means for storing at least one state variable, said status register access operation being performed in response to a status access instruction;

dispatch queue means for storing a dispatch queue of undispatched program instructions awaiting dispatch to one of said plurality of pipelines means;

commit queue means for storing a commit queue of uncommitted program instructions awaiting a determination to be permitted to complete processing;

result queue means for storing a result queue of unretired program instructions yet to update architectural state variables; and access timing control means for controlling access timing, said access timing control means being coupled to said special purpose pipeline means, said commit queue means and said result queue means, and said access timing control means being configured such that, when said status access instruction is issued to said special register pipeline means and while program instructions continue to be dispatched from said dispatch queue means, said access timing control means:

(i) controls said commit queue means such that no program instruction succeeding in program order said status access instruction within said stream of program instructions is permitted to complete processing;

(ii) detects from said result queue means a trigger state when all program instruction preceding in program order said status access instruction within said stream of program instructions have performed any updates to architectural state variables of said apparatus; and (iii) upon detection of said trigger state, triggers said special register pipeline means to perform said status register access operation.

Viewed from a further aspect the present invention provides a method of executing a stream of program instructions, said method comprising the steps of:

performing processing operations using a plurality of processing pipelines, said plurality of processing pipelines including a special register pipeline configured to performing a status register access operation to a status register configured to store at least one state variable, said status register access operation being performed in response to a status access instruction;

storing a dispatch queue of undispatched program instructions awaiting dispatch to one of said plurality of pipelines means;

storing a commit queue of uncommitted program instructions awaiting a determination to be permitted to complete processing;

storing a result queue of unretired program instructions yet to update architectural state variables; and controlling access timing, when said status access instruction is issued to said special register pipeline and while program instructions continue to be dispatched from said dispatch queue, by:

(i) controlling said commit queue such that no program instruction succeeding in program order said status access instruction within said stream of program instructions is permitted to complete processing;

(ii) detecting from said result queue a trigger state when all program instruction preceding in program order said status access instruction within said stream of program instructions have performed any updates to architectural state variable; and (iii) upon detection of said trigger state, triggering said special register pipeline to perform said status register access operation.

The above, and other objects, features and advantages of this invention will be apparent from the following detailed description of illustrative embodiments which is to be read in connection with the accompanying drawings.

DESCRIPTION OF THE EMBODIMENTS

Figure 1:
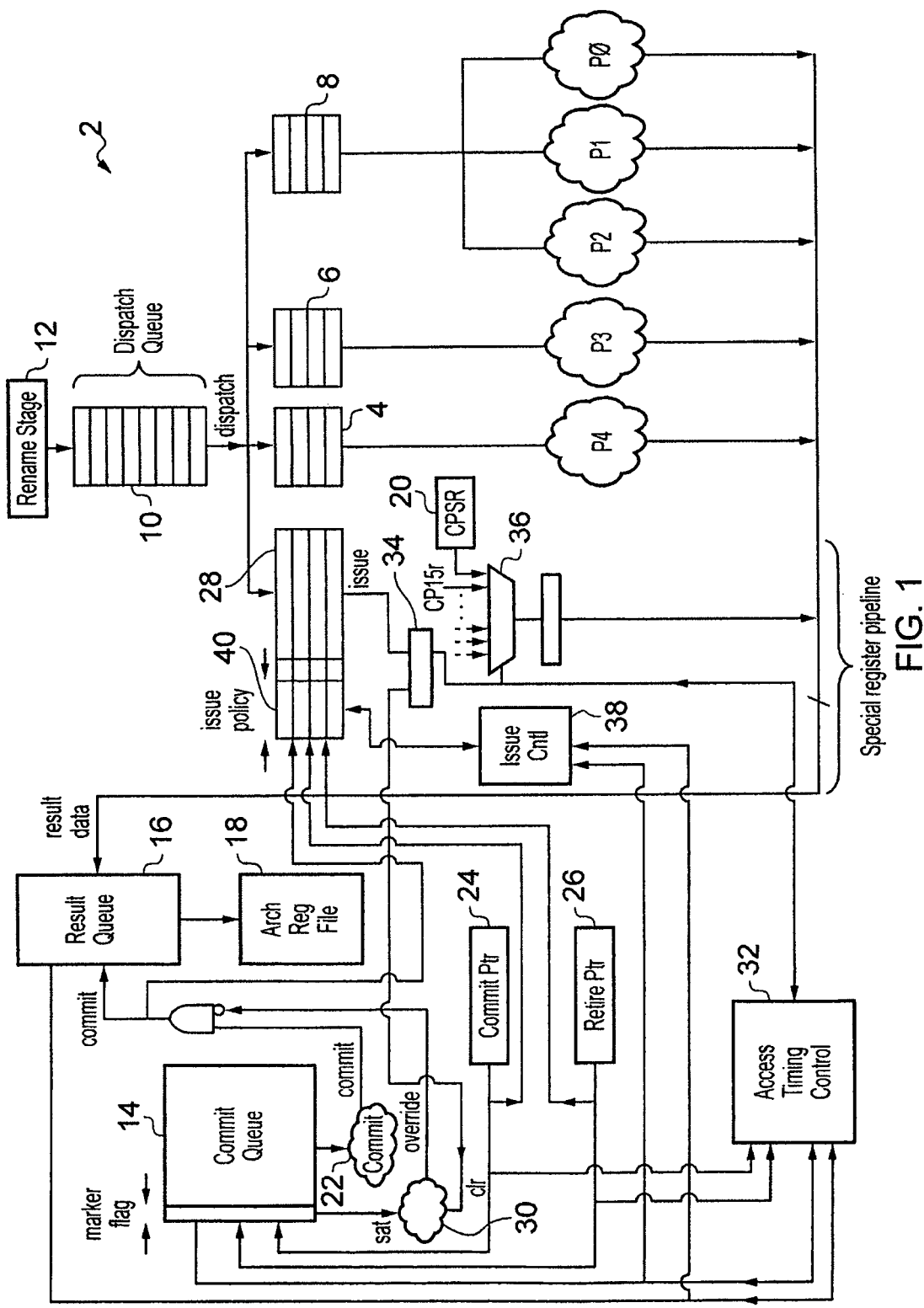
FIG. 1 schematically illustrates part of a data processing apparatus for executing a stream of program instructions.

FIG. 1 schematically illustrates part of an out-of-order processor 2 for executing a stream of program instructions. It will be appreciated by those in this technical field that such a processor 2 will typically include many more circuit elements, but these have been omitted from FIG. 1 for the sake of clarity. In particular, the present invention is concerned with the serialisation of status access instructions relative to other instructions being executed and this is performed by the circuit elements illustrated in FIG. 1.

The processor 2 includes a plurality of processing pipelines P0, P1, P2, P3, P4 and a special register pipeline. The processing pipelines P0 to P4 can take a variety of different forms, such as an integer pipeline, a floating point pipeline, a load/store pipeline and the like. Each of the processing pipelines P0 to P4 is supplied with instructions via an issue queue 4, 6, 8. An individual issue queue 4, 6 may be provided for some pipelines P4, P3 whereas other pipelines P0, P1, P2 may share an issue queue 8.

Program instructions are dispatched to the issue queues 4, 6, 8 from dispatch queue circuitry 10 storing a dispatch queue. The dispatch queue circuitry 10 receives instructions from a rename stage 12 which performs register renaming in accordance with normal out-of-order processing techniques. The dispatch queue circuitry stores a dispatch queue of undispatched program instructions that are awaiting dispatch to one of the plurality of pipelines.

Also included within the processor 4 are commit queue circuitry 14 storing a commit queue of uncommitted program instructions awaiting determination that they are to be permitted to complete their processing and result queue circuitry 16 configured to store a result queue of unretired program instructions yet to update architectural state variables of the processor 4. The architectural state variables may be stored within an architectural register file 18 as well as within other registers and storage locations of the processor 4, such as a current program status register 20 which is updated by the execution of program instructions by the processor 2.

When a program instruction is dispatched to one of the issue queues 4, 6, 8 (each stored within its own issue queue circuitry), a corresponding entries are made within the commit queue circuitry 14 and the result queue circuitry 16. The program instructions may be processed within their respective pipelines on a speculative basis, but will not be committed for execution until the speculative nature of their execution has been resolved. When the speculative nature of their execution has been resolved, e.g. any conditional branches resolved, any potential data aborts resolved, etc, then the program instructions will be marked as committed within the commit queue circuitry 14. Commit logic 22 associated with the commit queue circuitry 14 serves to identify which program instructions within the commit queue are marked as committed (i.e. are to be permitted to complete their processing including updating architectural state) and generates commit signals passed to the result queue within the result queue circuitry such that the corresponding entries within the result queue may also be marked as committed. When an entry within the result queue is marked as committed and its result data is marked as valid (i.e. the relevant processing pipeline has actually performed the data processing operation concerned and generated the associated destination operands), the entry within the result queue and their corresponding program instructions will be eligible for retirement from the result queue at which point their destination operands are written to the architectural register file 18 and permitted to update the architectural state of the system.

The instructions received by the rename stage and processed within the various subsequent queues are grouped into groups for the purposes of managing their commit status and their retirement status. Program instructions which share a group identifier will be committed and retired together (i.e. under the same control rather than strictly simultaneously). In order to assist in the management of the commit queue and the result queue, the processor 2 includes a commit pointer register 24 storing a commit pointer and a retirement pointer register 26 storing a retirement pointer. The commit pointer and the retirement pointer respectively indicate the position within the sequence of group identifiers allocated to the stream of program instructions to which commitment to the execution of those instructions has reached and the retirement of those instructions has reached.

The processor 2 also includes a special register pipeline having special register pipeline issue circuitry 28 for storing an issue queue of special register pipeline instructions. These special register pipeline instructions include status access instructions for reading state variables of the processor 2. These state variables may be architectural and micro-architectural state variables. Program instructions within the special purpose register issue queue are issued in order from that issue queue. In contrast, program instructions within the other issue queues 4, 6, 8 may be issued out-of-order.

When a status access instruction is added to the special purpose register pipeline instruction queue 28, the corresponding entry within the commit queue circuitry 14 for that status access instruction is marked with a marker flag. Override logic 30 coupled to the commit queue circuitry 14 is responsive to the marker flag for the status access instruction to block any program instructions succeeding the status access instruction in the program order from being completed until the status access instruction has itself been executed. This is part of the serialisation enforcement mechanism for the status access instruction.

After the status access instruction has been dispatched into the special register pipeline from the dispatch queue circuitry 10, the dispatch queue circuitry continues to dispatch program instructions.

Access timing control circuitry 32 is responsive to the commit pointer and the retirement pointer to detect when the retirement pointer matches the group ID of the status access instruction. At this time, all of the program instructions preceding the status access instructions will have been retired from the result queue and will have updated the architectural state variables of the processor 4 in a manner such that a valid access to a status register may now be performed as proper serialisation has been achieved.

The status access instruction is supplied to an instruction register 34 from the special register pipeline instruction queue circuitry 28. This instruction register 34 serves to control a multiplexer 36 to select the value stored within the appropriate status register and supply this as a result value (destination operand) to the result queue stored within the result queue circuitry 16. When the status access instruction is executed in this way, then a clear signal is sent to the commit override circuitry 30 unblocking the stalling of the commit queue thereby permitting succeeding program instructions in the program order to complete their processing.

The program instructions within the special register pipeline may be subject to an issue policy that is set on an instruction-by-instruction basis as the instructions are added to the issue queue for the special register pipeline. Issue controller circuitry 38 reads the issue policy field 40 and selects one of the plurality of issue policies to be applied to the program instruction concerned. These issue policies are all subject in-order exectution by the special register pipeline. The issue policies which may be specified include an early policy whereby a program instruction issues when all source operands for that program instruction are valid; a committed policy whereby a program instruction issues when the program instruction is committed for completion as marked within the commit queue and all source operands for the program instruction are valid; and an oldest unretired policy whereby a program instruction issues when all program instructions preceding that program instruction in program order have performed their updates to the architectural state variables of the system (i.e. being retired) in the program instruction is committed for completion and all source operands for the program instruction are valid. This permits different levels of issue control to be enforced in respect of different instructions processed by the special register pipeline. These special register pipeline instructions may have different levels of constraint upon when they should be performed relative to other program instructions in the processor 2 as a whole or relative to other instructions issued to the special register pipeline.

Figure 2:
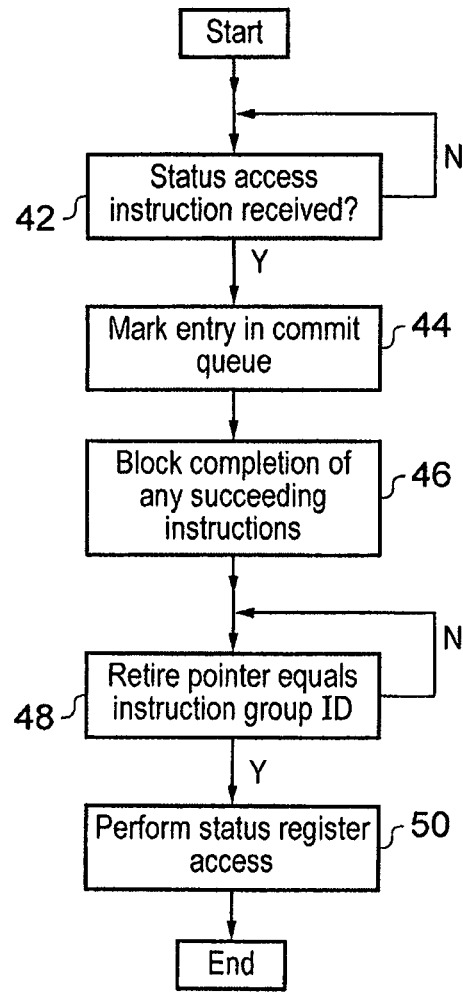
FIG. 2 is a flow diagram schematically illustrating control of status access instructions.

FIG. 2 is a flow diagram schematically illustrating control of issue of a status access instruction into the special register pipeline. At step 42 a status access instruction is received into the special register pipeline. At step 44 the corresponding entry within the commit queue is marked with the marker flag. Step 46 then serves to block completion of any succeeding program instructions within the program order using the commit override circuitry 30. Step 48 determines when the retirement pointer equals the instruction group ID corresponding to all preceding program instructions having made their changes to architectural state variables. Step 50 then releases the status access instruction to be performed within the special register pipeline, e.g. the status access instruction has been serialised relative to the other instructions within the program order.

Figure 3:
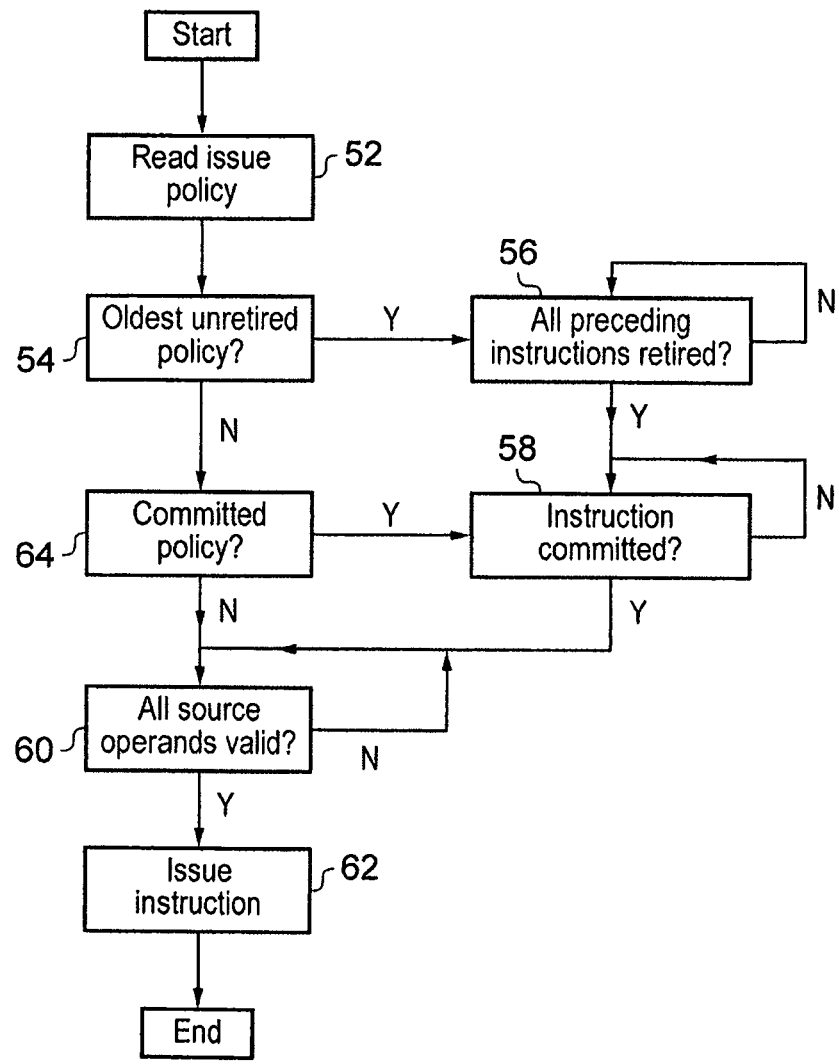
FIG. 3 is a flow diagram schematically illustrating issue control in accordance with a plurality of different issue policies for a special register pipeline.

FIG. 3 is a flow diagram schematically illustrating the control of issue in accordance with a plurality of issue policies within the register pipeline. At step 52 the issue policy specified within the issue policy field 40 for the program instruction at the issue end of the special register pipeline issue queue circuitry 28 is read. Step 54 determines whether the policy field indicates the oldest unretired policy. If the oldest unretired policy is indicated, then step 56 waits until all preceding instructions within the program order have been marked as retired as indicated by the retirement pointer read from the retirement order register 26. Processing then proceeds to step 58 and waits until the instruction concerned is marked as completed within the commit queue circuitry 14. Processing then proceeds to step 60 where a determination is made as to when all the source operands for the instruction are valid. When all the source operands are valid, then step 62 issues the instruction into the special register pipeline.

If the oldest unretired policy is not in use as determined at step 54, then step 64 serves to determine whether the committed policy is in use. If the committed policy is in use, then processing proceeds to step 58. If neither the committed policy nor the oldest unretired policy is in force, then the clear policy is in use and processing proceeds to step 60.

It will be appreciated that the oldest unretired policy in the above mentioned policies is used in the case of a status access request as previously discussed and the control of the performing of such a status access instruction is achieved in accordance with the flow diagram of FIG. 2.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for executing a stream of program instructions, said apparatus comprising:
    a plurality of processing pipelines including a special register pipeline configured to respond to a status access instruction to perform a status register access operation to a status register configured to store at least one state variable;
    dispatch queue circuitry configured to store a dispatch queue of undispatched program instructions awaiting dispatch to one of said plurality of pipelines and to dispatch said status access instruction to said special register pipeline;
    commit queue circuitry configured to store a commit queue of uncommitted program instructions awaiting a determination to be permitted to complete processing;
    result queue circuitry configured to store a result queue of unretired program instructions yet to update architectural state variables; and
    access timing control circuitry coupled to said special register pipeline, said commit queue circuitry and said result queue circuitry, said access timing control circuitry being configured such that, when said status access instruction is issued to said special register pipeline and while program instructions continue to be dispatched from said dispatch queue, said access timing control circuitry:
    (i) controls said commit queue circuitry such that no program instruction succeeding in program order said status access instruction within said stream of program instructions is permitted to complete processing;
    (ii) detects from said result queue circuitry a trigger state when all program instructions preceding in program order said status access instruction within said stream of program instructions have performed any updates to architectural state variables of said apparatus; and
    (iii) upon detection of said trigger state, triggers said special register pipeline to perform said status register access operation, comprising special register issue queue circuitry, each entry within said special register issue queue circuitry including an issue policy field for storing an issue policy value specifying one of a plurality of issue politics to be applied to issuing of a program instruction corresponding to said entry to said special register pipeline.

2. Apparatus as claimed in claim 1, wherein, after said special register pipeline has performed said status register access operation, said access timing control circuitry then permits said program instruction succeeding in program order said status access instruction within said stream of program instructions to complete processing.

3. Apparatus as claimed in claim 1, wherein said status register is a current program status register storing a program status value set by execution of program instructions preceding in program order said status access instruction within said stream of program instructions.

4. Apparatus as claimed in claim 1, comprising a commit pointer register configured to store a commit pointer indicating an oldest uncommitted program instruction within said commit queue.

5. Apparatus as claimed in claim 4, wherein an entry within said commit queue for said status access instruction includes a marker flag and said access timing control circuitry detects when said commit pointer indicates said entry including said marker flag to determine when there are no uncommitted program instructions preceding in program order said status access instruction and then stall said commit queue circuitry.

6. Apparatus as claimed in claim 4, comprising a retirement pointer register configured to store a retirement pointer indicating an oldest unretired program instructions.

7. Apparatus as claimed in claim 6, wherein said access timing control circuitry detects when said retirement pointer matches said commit pointer as indicating said trigger state.

8. Apparatus as claimed in claim 1, wherein said plurality of issue policies comprise at least one of:
    (i) an early policy whereby a program instruction issues when all source operands for said program instruction are valid;
    (ii) a committed policy whereby a program instruction issues when said program instruction is committed for completion and all source operands for said program instruction are valid; and
    (iii) an oldest unretired policy whereby a program instruction issues when all program instruction preceding in program order said program instruction within said stream of program instructions have performed any updates to architectural state variables of said apparatus and all source operands for said program instruction are valid.

9. Apparatus as claimed in claim 1, wherein said access timing control circuitry is formed of a plurality portions located at different positions within said apparatus.

10. Apparatus for executing a stream of program instructions, said apparatus comprising:
a plurality of processing pipelines means for performing processing operations, said plurality of processing pipeline means including a special register pipeline means for performing a status register access operation to a status register means for storing at least one state variable, said status register access operation being performed in response to a status access instruction;
dispatch queue means for storing a dispatch queue of undispatched program instructions awaiting dispatch to one of said plurality of pipelines means and for dispatching said status access instruction to said special register pipeline means;
commit queue means for storing a commit queue of uncommitted program instructions awaiting a determination to be permitted to complete processing;
result queue means for storing a result queue of unretired program instructions yet to update architectural state variables; and
access timing control means for controlling access timing, said access timing control means being coupled to said special register pipeline means, said commit queue means and said result queue means, and said access timing control means being configured such that, when said status access instruction is issued to said special register pipeline means and while program instructions continue to be dispatched from said dispatch queue means, said access timing control means:
(i) controls said commit queue means such that no program instruction succeeding in program order said status access instruction within said stream of program instructions is permitted to complete processing;
(ii) detects from said result queue means a trigger state when all program instructions preceding in program order said status access instruction within said stream of program instructions have performed any updates to architectural state variables of said apparatus; and
(iii) upon detection of said trigger state, triggers said special register pipeline means to perform said status register access operation, comprising special register issue queue means, each entry within said special register issue queue means including an issue policy field for storing an issue policy value specifying one of a plurality of issue policies to be applied to issuing of a program instruction corresponding to said entry to said special register pipeline.

11. A method of executing a stream of program instructions, said method comprising the steps of:
performing processing operations using a plurality of processing pipelines, said plurality of processing pipelines including a special register pipeline configured to perform a status register access operation to a status register configured to store at least one state variable, said status register access operation being performed in response to a status access instruction;
storing a dispatch queue of undispatched program instructions awaiting dispatch to one of said plurality of pipelines and dispatching said status access instruction from said dispatch queue to said special register pipeline;
storing a commit queue of uncommitted program instructions awaiting a determination to be permitted to complete processing;
storing a result queue of unretired program instructions yet to update architectural state variables; and
controlling access timing, when said status access instruction is issued to said special register pipeline and while program instructions continue to be dispatched from said dispatch queue, by:
(i) controlling said commit queue such that no program instruction succeeding in program order said status access instruction within said stream of program instructions is permitted to complete processing;
(ii) detecting from said result queue a trigger state when all program instructions preceding in program order said status access instruction within said stream of program instructions have performed any updates to architectural state variables; and
(iii) upon detection of said trigger state, triggering said special register pipeline to perform said status register access operation, comprising strong entries within a special register issue queue circuitry, each entry including an issue policy field for storing an issue policy value specifying one of a plurality of issue policies to be applied to issuing of a program instruction corresponding to said entry to said special register pipeline.

12. A method as claimed in claim 11, wherein, after said special register pipeline has performed said status register access operation, said step of controlling access timing then permits said program instruction succeeding in program order said status access instruction within said stream of program instructions to complete processing.

13. A method as claimed in claim 11, wherein said status register is a current program status register storing a program status value set by execution of program instructions preceding in program order said status access instruction within said stream of program instructions.

14. A method as claimed in claim 11, comprising storing a commit pointer indicating an oldest uncommitted program instruction within said commit queue.

15. A method as claimed in claim 14, wherein an entry within said commit queue for said status access instruction includes a marker flag and said step of controlling access timing detects when said commit pointer indicates said entry including said marker flag to determine when there are no uncommitted program instructions preceding in program order said status access instruction and then stall said commit queue.

16. A method as claimed in claim 14, comprising storing a retirement pointer indicating an oldest unretired program instructions.

17. A method as claimed in claim 16, wherein said step of controlling access timing detects when said retirement pointer matches said commit pointer as indicating said trigger state.

18. A method as claimed in claim 11, wherein said plurality of issue policies comprise at least one of:
(i) an early policy whereby a program instruction issues when all source operands for said program instruction are valid;
(ii) a committed policy whereby a program instruction issues when said program instruction is committed for completion and all source operands for said program instruction are valid; and
(iii) an oldest unretired policy whereby a program instruction issues when all program instruction preceding in program order said program instruction within said stream of program instructions have performed any updates to architectural state variables of said apparatus and all source operands for said program instruction are valid.

\* \* \* \* \*